(12) United States Patent
Xie et al.

(10) Patent No.: US 9,577,538 B2
(45) Date of Patent: *Feb. 21, 2017

(54) UTILIZING SECONDARY-SIDE CONDUCTION TIME PARAMETERS OF A SWITCHING POWER CONVERTER TO PROVIDE ENERGY TO A LOAD

(71) Applicant: KONINKLIJKE PHILIPS N.V., Eindhoven (NL)

(72) Inventors: Yanhui Xie, Austin, TX (US); Michael A. Kost, Cedar Park, TX (US); John L. Melanson, Austin, TX (US); Zhaohui He, Austin, TX (US); Chris M. Franklin, Austin, TX (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/701,946

(22) Filed: May 1, 2015

(65) Prior Publication Data

US 2015/0340956 A1    Nov. 26, 2015

Related U.S. Application Data

(63) Continuation of application No. 14/201,050, filed on Mar. 7, 2014, now Pat. No. 9,024,541.

(60) Provisional application No. 61/774,115, filed on Mar. 7, 2013.

(51) Int. Cl.
| | |
|---|---|
| *H05B 37/02* | (2006.01) |
| *H02M 3/335* | (2006.01) |
| *H05B 33/08* | (2006.01) |

(52) U.S. Cl.
CPC ........ *H02M 3/33507* (2013.01); *H05B 33/08* (2013.01); *H05B 33/0815* (2013.01); *Y02B 20/346* (2013.01)

(58) Field of Classification Search
CPC ............................... H05B 33/08; H05B 37/02
USPC ... 315/209 R, 224, 225, 274, 276, 287, 291, 315/297, 307, 360; 363/21.12
See application file for complete search history.

(56) References Cited

U.S. PATENT DOCUMENTS

| | | | |
|---|---|---|---|
| 8,222,832 B2 * | 7/2012 | Zheng ................ | H05B 33/0815 315/211 |
| 2011/0037414 A1 * | 2/2011 | Wang ................ | H05B 33/0815 315/297 |

* cited by examiner

*Primary Examiner* — Tung X Le

(57) ABSTRACT

A power distribution system includes controller of a switching power converter to control the switching power converter and determine one or more switching power converter control parameters. In at least one embodiment, the switching power converter utilizes a transformer to transfer energy from a primary-side of the transformer to a secondary-side of the transformer. In at least one embodiment, the switching power converter control parameters includes a secondary-side conduction time delay that represents a time delay between when the primary-side ceases conducting a primary-side current and the secondary-side begins to conduct a secondary-side current. In at least one embodiment, determining and accounting for this secondary-side conduction time delay increases the prediction accuracy of the secondary-side current value and accurate delivery of energy to a load when the controller does not directly sense the secondary-side current provided to the load.

1 Claim, 5 Drawing Sheets

UTILIZING SECONDARY-SIDE CONDUCTION TIME PARAMETERS OF A SWITCHING POWER CONVERTER TO PROVIDE ENERGY TO A LOAD

CROSS-REFERENCE TO RELATED APPLICATION

This application claims the benefit under 35 U.S.C. §119 (e) and 37 C.F.R. §1.78 of U.S. Provisional Application No. 61/774,115, filed Mar. 7, 2013, which is incorporated by reference in its entirety.

BACKGROUND OF THE INVENTION

Field of the Invention

The present invention relates in general to the field of electronics, and more specifically to a method and system for utilizing secondary-side conduction time parameters of a switching power converter to provide energy to a load.

Description of the Related Art

Many electronic systems utilize switching power converters to efficiently convert power from one source into power useable by a device (referred to herein as a "load"). For example, power companies often provide alternating current (AC) power at specific voltages within a specific frequency range. However, many loads utilize power at a different voltage and/or frequency than the supplied power. For example, some loads, such as light emitting diode (LED) based lamps operate from a direct current (DC). "DC current" is also referred to as "constant current". "Constant" current does not mean that the current cannot change over time. The DC value of the constant current can change to another DC value. Additionally, a constant current may have noise or other minor fluctuations that cause the DC value of the current to fluctuate. "Constant current devices" have a steady state output that depends upon the DC value of the current supplied to the devices.

LEDs are becoming particularly attractive as main stream light sources in part because of energy savings through high efficiency light output, long life, and environmental incentives such as the reduction of mercury. LEDs are semiconductor devices and are best driven by direct current. The brightness of the LED varies in direct proportion to the DC current supplied to the LED. Thus, increasing current supplied to an LED increases the brightness of the LED and decreasing current supplied to the LED dims the LED.

FIG. 1 depicts power distribution system 100 that converts power from voltage source 102 into power usable by load 104. Load 104 is any type of load, such as a load that includes one or more LEDs. A controller 106 controls the power conversion process. Voltage source 102 is any voltage source such as a rectified alternating current (AC) input voltage or a DC voltage source. In at least one embodiment, the voltage source 102 is, for example, a public utility, and the AC voltage $V_{IN}$ is, for example, a 60 Hz/110 V line voltage in the United States of America or a 50 Hz/220 V line voltage in Europe. The switching power converter 110 serves as a power supply that converts the AC voltage $V_X$ into a DC link voltage $V_{LINK}$.

The controller 106 provides a control signal $CS_1$ to control conductivity of the current control switch 112 of flyback-type switching power converter 110 to control the conversion of the input voltage $V_{IN}$ into a secondary voltage $V_S$. When control signal $CS_1$ causes switch 112 to conduct, a primary-side current $i_{PRIMARY}$ flows into a primary coil 114 of transformer 116 to magnetize the primary coil 114. When control signal $CS_1$ opens switch 112, primary coil 114 demagnetizes. The magnetization and demagnetization of the primary coil 114 induces a secondary voltage $V_S$ across a secondary coil 118 of transformer 116. Primary voltage $V_P$ is N times the secondary voltage $V_S$, i.e. $V_P = N \cdot V_S$, and "N" is a ratio of coil turns in the primary coil 114 to the coil turns in the secondary coil 118. The secondary-side current $i_{SECONDARY}$ is a direct function of the secondary voltage $V_S$ and the impedance of diode 120, capacitor 122, and load 104. Diode 120 allows the secondary-side current $i_{SECONDARY}$ to flow in one direction. The secondary-side current $i_{SECONDARY}$ charges capacitor 122, and capacitor 122 maintains an approximately DC voltage $V_{LOAD}$ across load 104. Waveforms 123 depict exemplars of control signal $CS_1$, primary-side current $i_{PRIMARY}$, and secondary-side current $i_{SECONDARY}$. It is commonly assumed that the secondary-side current $i_{SECONDARY}$ rises virtually instantaneously after the primary-side winding 114 stops conducting the primary-side current $i_{PRIMARY}$.

Since the control signal $CS_1$ generated by the controller 106 controls the primary-side current $i_{PRIMARY}$, and the primary-side current $i_{PRIMARY}$ controls the voltage $V_P$ across the primary coil 114, the energy transfer from the primary coil 114 to the secondary coil 118 is controlled by the controller 106. Thus, the controller 106 controls the secondary-side current $i_{SECONDARY}$.

The controller 106 operates the switching power converter 110 in a certain mode, such as quasi-resonant mode. In quasi-resonant mode, the control signal $CS_1$ turns switch 112 ON at a point in time that attempts to minimize the voltage across switch 112, and, thus, minimize current through switch 112. Controller 106 generates the control signal $CS_1$ in accordance with a sensed primary-side current $i_{PRIMARY\_SENSE}$, obtained via signal $i_{LINK\_SENSE}$ from link current sense path 126.

To attempt to deliver a known amount of power to the load 104, the controller 106 can determine the amount of power delivered to the load 104 by knowing the values of the secondary-side voltage $V_S$ and the secondary-side current $i_{SECONDARY}$. The controller 106 can derive the secondary-side voltage $V_S$ from the primary-side voltage $V_P$ in accordance with $V_P = N \cdot V_S$, as previously discussed. The controller 106 determines the value of the secondary-side current $i_{SECONDARY}$ by monitoring the value of $i_{SECONDARY\_SENSE}$, which is a scaled version of the secondary-side current $i_{SECONDARY}$ with a scaling factor of M. "M" is a number representing fractional ratio of the secondary-side current $i_{SECONDARY}$ to the secondary-side sense current $i_{SECONDARY\_SENSE}$. Thus, the power $P_{LOAD}$ delivered to the load 104 is $P_{LOAD} = V_P/N \cdot M \cdot i_{SECONDARY\_SENSE}$.

However, directly sensing the secondary-side current $i_{SECONDARY}$ generally requires an opto-coupler or some other relatively expensive component to provide connectivity to the secondary-side of transformer 116.

SUMMARY OF THE INVENTION

In one embodiment of the present invention, a method includes receiving one or more signals from a flyback-type switching power converter and processing the one or more signals to determine an approximate secondary-side conduction time delay that occurs from cessation of primary-side current conduction in a transformer of a flyback-type switching power converter until conduction begins in a secondary-side current in the transformer. The method further includes determining the secondary-side current conduction time utilizing the secondary-side conduction time delay and determining an approximate amount of charge transferred to the secondary-side of the transformer using the determined secondary-side current conduction time. The method also includes generating a current control signal to control power delivered to a load coupled to the switching power converter based on the determined approximate amount of charge transferred to the secondary-side of the transformer.

In another embodiment of the present invention, an apparatus includes a controller configured to receive one or more signals from a flyback-type switching power converter and process the one or more signals to determine an approximate secondary-side conduction time delay that occurs from cessation of primary-side current conduction in a transformer of a flyback-type switching power converter until conduction begins in a secondary-side current in the transformer. The controller is further configured to determine the secondary-side current conduction time utilizing the secondary-side conduction time delay and determine an approximate amount of charge transferred to the secondary-side of the transformer using the determined secondary-side current conduction time. The controller is also configured to generate a current control signal to control power delivered to a load coupled to the switching power converter based on the determined approximate amount of charge transferred to the secondary-side of the transformer.

In a further embodiment of the present invention, a lamp includes a switching power converter and a load coupled to the switching power converter. In at least one embodiment, the load includes one or more light emitting diodes. The lamp further includes a controller coupled to the switching power converter to control the switching power converter. The controller is configured to receive one or more signals from a flyback-type switching power converter and process the one or more signals to determine an approximate secondary-side conduction time delay that occurs from cessation of primary-side current conduction in a transformer of a flyback-type switching power converter until conduction begins in a secondary-side current in the transformer. The controller is further configured to determine the secondary-side current conduction time utilizing the secondary-side conduction time delay and determine an approximate amount of charge transferred to the secondary-side of the transformer using the determined secondary-side current conduction time. The controller is also configured to generate a current control signal to control power delivered to a load coupled to the switching power converter based on the determined approximate amount of charge transferred to the secondary-side of the transformer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A power distribution system includes a controller of a switching power converter to control the switching power converter and determine one or more switching power converter control parameters. In at least one embodiment, the switching power converter utilizes a transformer to transfer energy from a primary-side of the transformer to a secondary-side of the transformer. In at least one embodiment, the switching power converter control parameters include a secondary-side conduction time delay that represents a time delay between when the primary-side ceases conducting a primary-side current and the secondary-side begins to conduct a secondary-side current (referred to herein as a "secondary-side conduction time delay"). In at least one embodiment, determining and accounting for this secondary-side conduction time delay increases the prediction accuracy of the secondary-side current value and accurate delivery of energy to a load when the controller does not directly sense the secondary-side current provided to the load. In at least one embodiment, in addition to the secondary-side conduction time delay, the controller also takes into account resonance of a sensed voltage signal that can cause errors in detection by the controller of an end of secondary-side current conduction. Thus, in at least one embodiment, the controller utilizes at least the secondary-side conduction time delay and, in at least one embodiment, also accounts for the resonance, to generate a control signal to control the secondary-side current delivered to a load.

During operation of the power distribution system, an input voltage source is connected to the primary-side of the transformer, and a load is connected to the secondary-side. For a constant current load, such as a light emitting diode (LED), accurately controlling the secondary-side current provided to the load allows the load to function in a predictable manner. Loads such as LEDs can be particularly sensitive to current variations that differ from an intended output current. For example, the brightness of an LED is dependent on the value of the current supplied to the LED. Thus, in at least one embodiment, determining and accounting for the secondary-side conduction time delay increases the accurate control of the secondary-side current provided to the load. With respect to an LED, accurate control of the current delivered to the load allows the controller to accurately control the brightness of the LED.

Figure 1:
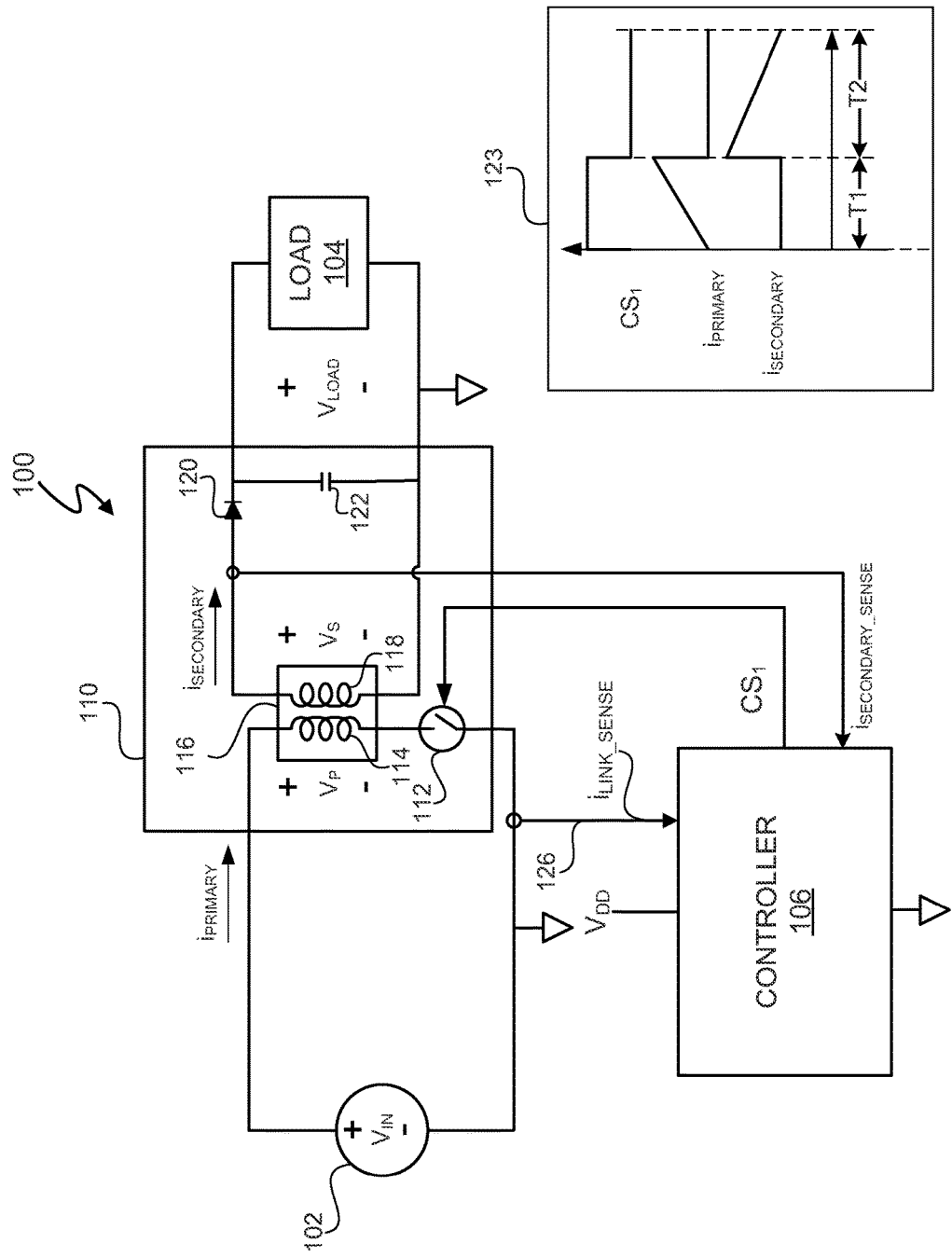
FIG. 1 (labeled prior art) depicts a power distribution system.
Figure 2:
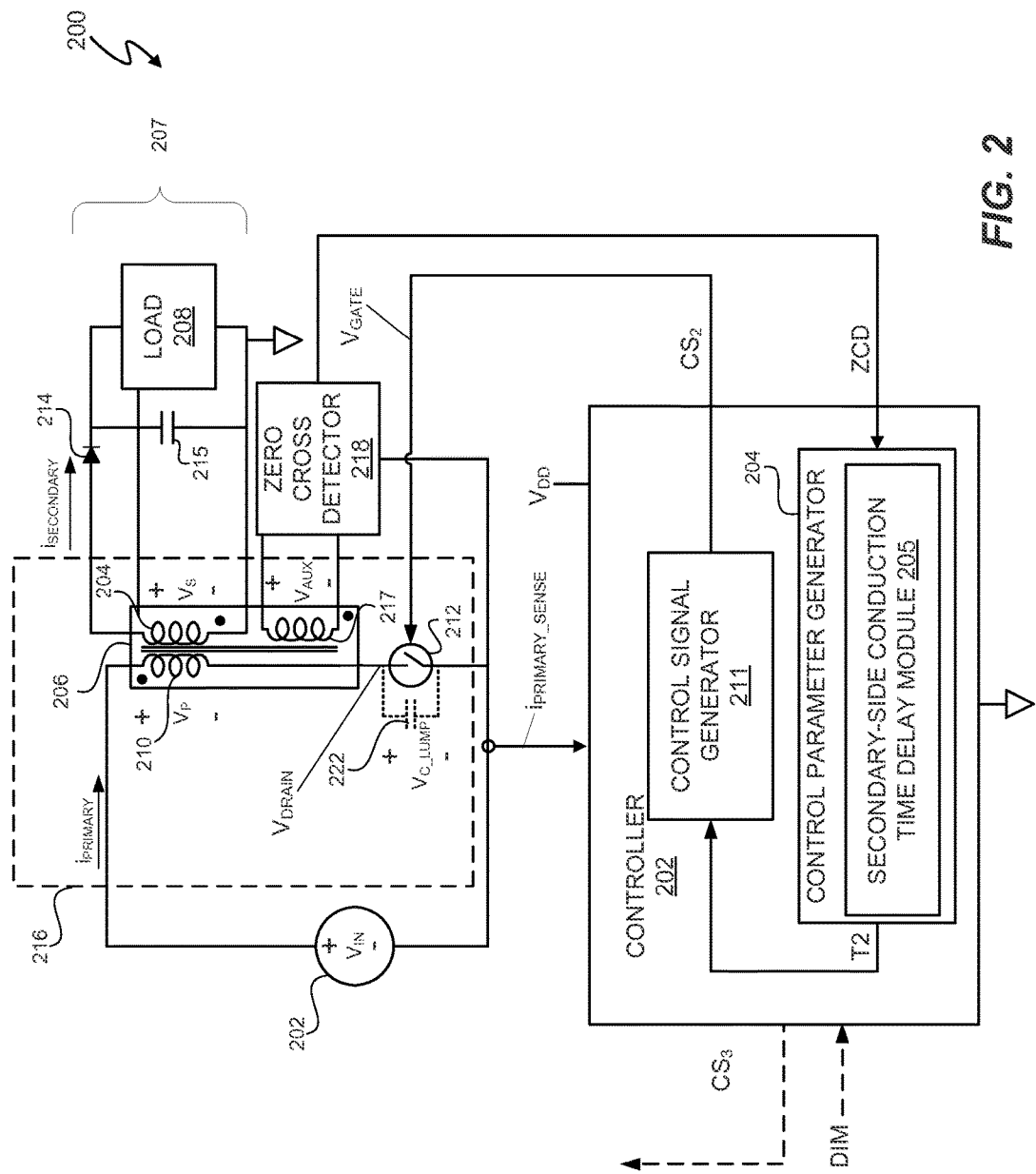
FIG. 2 depicts a power distribution system that utilizes a secondary-side conduction time delay to determine energy delivered to a load.

FIG. 2 depicts a power distribution system 200 that includes a controller 202 that determines one or more control parameters for the flyback-type switching power converter 216 using a control parameter generator 204. The control parameter generator 204 includes a secondary-side conduction time delay module 205 (referred to herein as the "time delay module 205"). The controller 202 utilizes a secondary-side conduction time delay to determine energy delivered to a load. As subsequently explained in more detail, the time delay module 205 determines a delay time between when the primary current $i_{PRIMARY}$ stops conducting and the secondary current $i_{SECONDARY}$ starts conducting during a switching period of the primary-side, current control switch 212. The switching power converter 216 includes non-ideal components, whose non-idealities contribute to the delays between the conduction times of currents $i_{PRIMARY}$ and $i_{SECONDARY}$. For example, the current control switch 212 includes a parasitic capacitor 222 that causes delays in reversing the voltage across the primary-winding 210 of the transformer 206 when the current control switch 212 transitions from conducting ("ON") to non-conducting ("OFF") during a cycle of the current control switch 212. In at least one embodiment, to avoid relatively expensive isolation couplings, such as an optocoupler, the controller 202 does not sense operating parameters, such as the secondary-side voltage $V_S$ or the secondary-side, directly from the load side 207 of the transformer 206. In at least one embodiment, the controller 202 uses one or more signals from the switching power converter 216, other than signals from the load side 207, to determine the secondary-side conduction delay and thereby more accurately determine an amount of energy provided to the load 208 during a cycle of the current control switch 212. Determining the amount of energy provided to the load 208 allows the controller 202 to determine a duty cycle of the control signal $CS_2$ to continue providing a desired amount of energy to the load 208.

In at least one embodiment, the control parameter generator 204 also determines a resonant period of the secondary voltage $V_S$ and utilizes the resonant period to further refine the determination of the amount of energy delivered to the load 208 and consequent determination of the duty cycle of the control signal $CS_2$.

The secondary-side voltage $V_S$ enters a decaying resonant period after the current decayed to zero in the secondary-side winding. Causing the current control switch to conduct at an estimated time of a minimum value of the secondary-side voltage is efficient; however, determining when the minimum value will occur presents a challenge. In at least one embodiment, the resonant period of the secondary-side voltage $V_S$ is relatively stable from cycle-to-cycle of the control signal $CS_2$. By indirectly sensing the secondary-side voltage $V_S$, such as sensing a reflected secondary-side voltage $V_{AUX}$, the controller 202 can sense zero crossings of the secondary-side voltage $V_S$. By sensing the time between at least two of the zero crossings, the controller 202 can determine a resonant period factor $T_{RES}$ (see FIG. 3). Since the time between a zero crossing and a minimum value of the secondary-side resonant voltage equals the resonant period $T_{RES}$ divided by 4 (referred to at "$T_{RES}/4$"), in at least one embodiment, the controller 202 can determine the timing of the minimum value by adding the resonant period factor $T_{RES}/4$ to the time of the detected zero crossing at time $t_5$.

In at least one embodiment, the controller 202 generally operates the switching power converter 216 in discontinuous conduction mode, critical conduction mode, or quasi-resonant mode. However, in at least one embodiment, the controller 202 probes a reflected, secondary-side voltage $V_S$ to determine the resonant period $T_{RES}$ by extending a duration of the current control switch cycle to include one or more consecutive resonant periods. In at least one embodiment, probing the resonant period occurs during multiple consecutive and/or non-consecutive switch cycles to determine the duration of multiple resonant periods. In at least one embodiment, the controller 202 includes a digital filter (not shown) to process the multiple resonant periods to obtain a single estimation of the resonant period, such as by averaging the multiple resonant periods to obtain an average resonant period. In at least one embodiment, the controller 202 probes the reflected, secondary-side voltage $V_S$ when an input voltage $V_{IN}$ to the primary-side 210 of the transformer 206 is sufficient to reverse bias a body diode (not shown) of the current control switch 212 to more accurately determine the resonant period factor $T_{RES}$.

Additionally, the secondary-side current leads the secondary-side voltage in phase by ninety degrees (90°). Thus, in at least one embodiment, the controller 202 can determine when the secondary-side current $i_{SECONDARY}$ decayed to approximately zero by subtracting the resonant period factor $T_{RES}/4$ from an initial occurrence during a switch conduction cycle of a zero crossing at $t_5$ of the secondary-side voltage $V_S$. Additionally, in at least one embodiment, the determination of the switching power converter control parameters occurs using data sensed from a reflected secondary-side voltage $V_{AUX}$ without a physical connection to the secondary-side.

In at least one embodiment, determination of the resonant period and use of the resonant period in determining control signal $CS_2$ is described in more detail in U.S. patent application Ser. No. 13/486,625, entitled "Control Data Determination From Primary-Side Sensing of a Secondary-Side Voltage in a Switching Power Converter," assignee Cirrus Logic, Inc., inventors Robert T. Grisamore and Zhaohui He, and filed on Jun. 1, 2012 and U.S. Provisional Application No. 61/492,871, filed Jun. 3, 2011, and entitled "Resonant Period Extractor for Switching Mode Power Supply," which are both incorporated by reference in their entireties and referred to herein as "Grisamore/He".

The controller 202 regulates the power delivered to load 208 by regulating the primary-side current $i_{PRIMARY}$ conducted by the primary-side coil 210. Load 208 can be any type of load, such as one or more light emitting diodes (LEDs). In at least one embodiment, the controller 202, the switching power converter 216, and the load 208 are included as part of a lamp (not shown). The controller 202 includes a control signal generator 211 to generate a control signal $CS_2$ to control the conductivity of current control switch 212 and, thus, control the switching power converter 216. The control signal generator 211 regulates the primary-side current $i_{PRIMARY}$ by regulating the duty cycle of control signal $CS_2$, which regulates the duty cycle of exemplary current control switch 212. The current control switch 212 can be any type of switch and, in at least one embodiment, is a field effect transistor (FET). The primary-side current $i_{PRIMARY}$ energizes the primary-side coil 210 when the control signal $CS_2$ causes the switch 212 to conduct during period T1 as shown in the exemplary waveforms 218. As indicated by the dot configuration of the transformer 206, when the primary-side current $i_{PRIMARY}$ flows from the primary side coil 210 towards the switch 212, the induced secondary-side voltage $V_S$ reverse biases diode 214. When diode 214 is reversed biased, the secondary-side current $i_{SECONDARY}$ is zero, and the capacitor 215 supplies energy to the load 208. After switch 212 stops conducting, the polarity of the primary-side voltage $V_P$ and the secondary-side voltage reverses, which is often referred to as the flyback period. The reversal of the secondary-side voltage $V_S$ forward biases diode 214. When the diode 214 is forward biased, the secondary-side current $i_{SECONDARY}$ rises virtually instantaneously and then ramps down to zero when the switching power converter 216 operates in discontinuous conduction mode or critical conduction mode.

The controller 202 senses the primary-side current via primary-side sense current $i_{PRIMARY\_SENSE}$, which is, for example, a scaled version of the primary-side current $i_{PRIMARY}$ The controller 202 determines the pulse width of control signal $CS_2$ to maintain the primary-side current $i_{PRIMARY}$ within a predetermined range. In at least one embodiment, the predetermined range is dictated by the component values of transformer 206, diode 214, capacitor 215, and the power demand of load 208. The particular manner of generating control signal $CS_2$ is a matter of design choice. Exemplary systems and methods for generating the switch control signal $CS_2$ are described in, for example, U.S. patent application Ser. No. 13/174,404, entitled "Constant Current Controller With Selectable Gain", assignee Cirrus Logic, Inc., and inventors John L. Melanson, Rahul Singh, and Siddharth Maru, and U.S. patent application Ser. No. 12/919,086, filed on Jun. 1, 2012, entitled "Primary-Side Control of a Switching Power Converter With Feed Forward Delay Compensation", assignee Cirrus Logic, Inc., inventors Zhaohui He, Robert T. Grisamore, and Michael A. Kost, which are both hereby incorporated by reference in their entireties. The power demand of the load 208 can be determined in any number of ways. For example, the power demand of the load 208 can be stored in a memory (not shown) of the controller 202, provided as a dimming level in the optional DIM signal, or set by a reference resistor (not shown).

Figure 3:
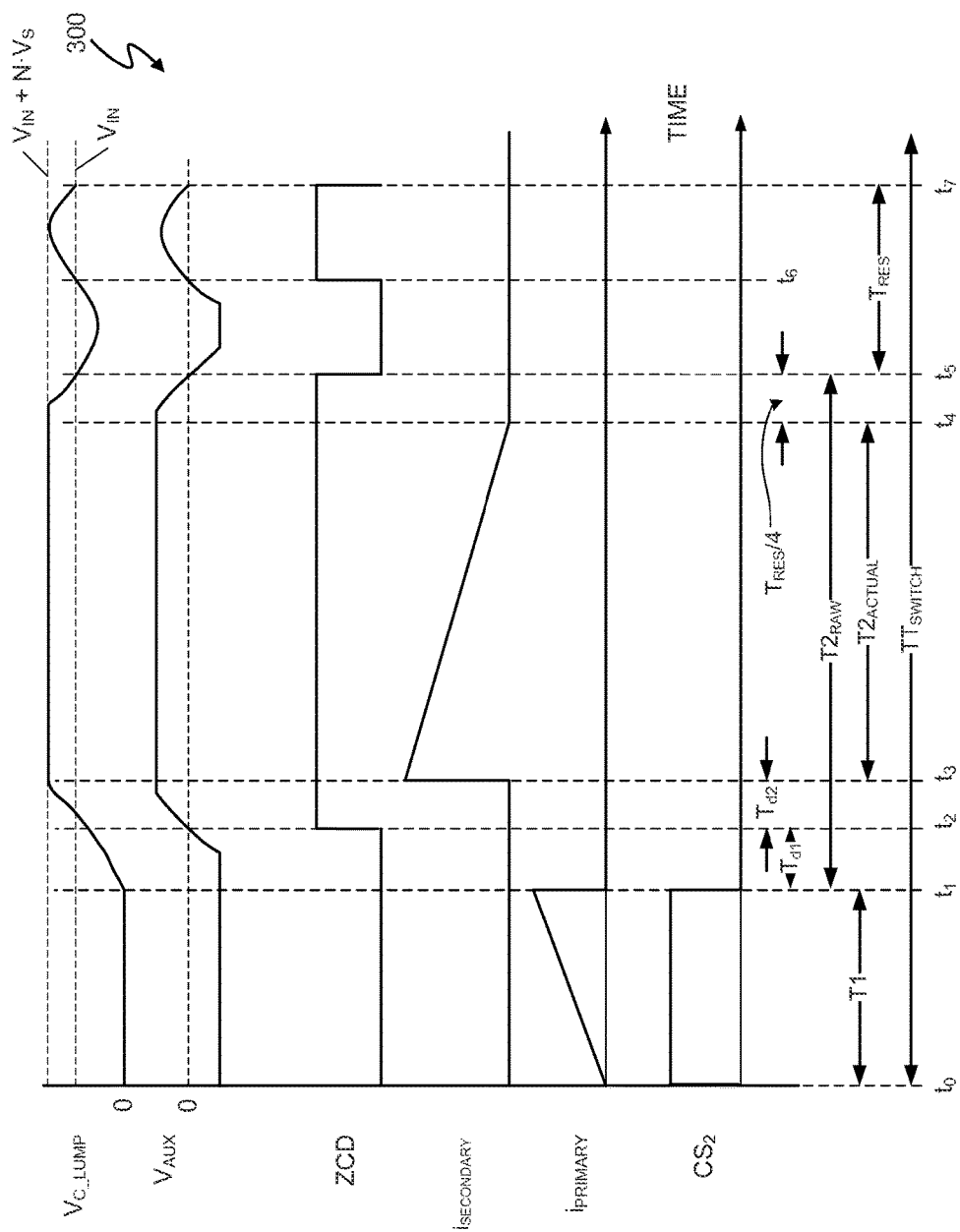
FIG. 3 depicts exemplary waveforms associated with the system of FIG. 2.

FIG. 3 depicts exemplary signal waveforms 300, which represents exemplary signals present during the operation of power distribution system 200. Referring to FIGS. 2 and 3, the amount of energy delivered to the secondary-side of transformer 206 depends in part on knowing the ending time of period $T2_{ACTUAL}$, which corresponds to the actual period of time during which the secondary-side current $i_{SECONDARY}$ conducts during a switching cycle of control signal $CS_2$.

In at least one embodiment, Equation 1 represents an amount of charge $Q_{LOAD}$ transferred to the load 208 during each cycle of the control signal $CS_2$:

$$Q_{LOAD} = N \cdot i_{PEAK} \cdot T2_{ACTUAL} \qquad \text{Equation 1}$$

where during each cycle of the control signal $CS_2$, $Q_{LOAD}$ represents an amount of charge delivered to the load 208, N represents the turns ratio of the primary-winding 210 to the secondary-winding 204, $i_{PEAK}$ represents a peak value of the primary-side current $i_{PRIMARY}$, and $T2_{ACTUAL}$ represents the actual period of the secondary current $i_{SECONDARY}$. Controller 202 determines the value of $i_{PEAK}$ by sensing the signal $i_{PRIMARY\_SENSE}$, which represents the primary current $i_{PRIMARY}$. The manner of generating the sense signal $i_{PRIMARY\_SENSE}$ is a matter of design choice, and, in at least one embodiment, is deduced from a voltage signal sampled across a resistor (not shown) in the current path of the primary current $i_{PRIMARY}$ through current control switch 212.

In at least one embodiment, Equation 2 represents an average secondary current $i_{SECONDARY}$ during each cycle of the control signal $CS_2$:

$$i_{SECONDARY(AVERAGE)} = \frac{N \cdot i_{PEAK} \cdot T2_{ACTUAL}}{2 \cdot TT} \qquad \text{Equation 2}$$

where TT represents the period of one cycle of the control signal $CS_2$, and the other variables are the same as in Equation 1.

Thus, in at least one embodiment, controller 202 sets the value of $i_{PEAK}$ by controlling the duration T1 of a pulse of control signal $CS_1$ and sets the cycle period TT of control signal $CS_2$ by setting the duty cycle of control signal $CS_2$. Thus, increasing the accuracy of determining the secondary-side current conduction time $T2_{ACTUAL}$, increases the accuracy of determining an amount of energy delivered to the load 208.

Figure 4:
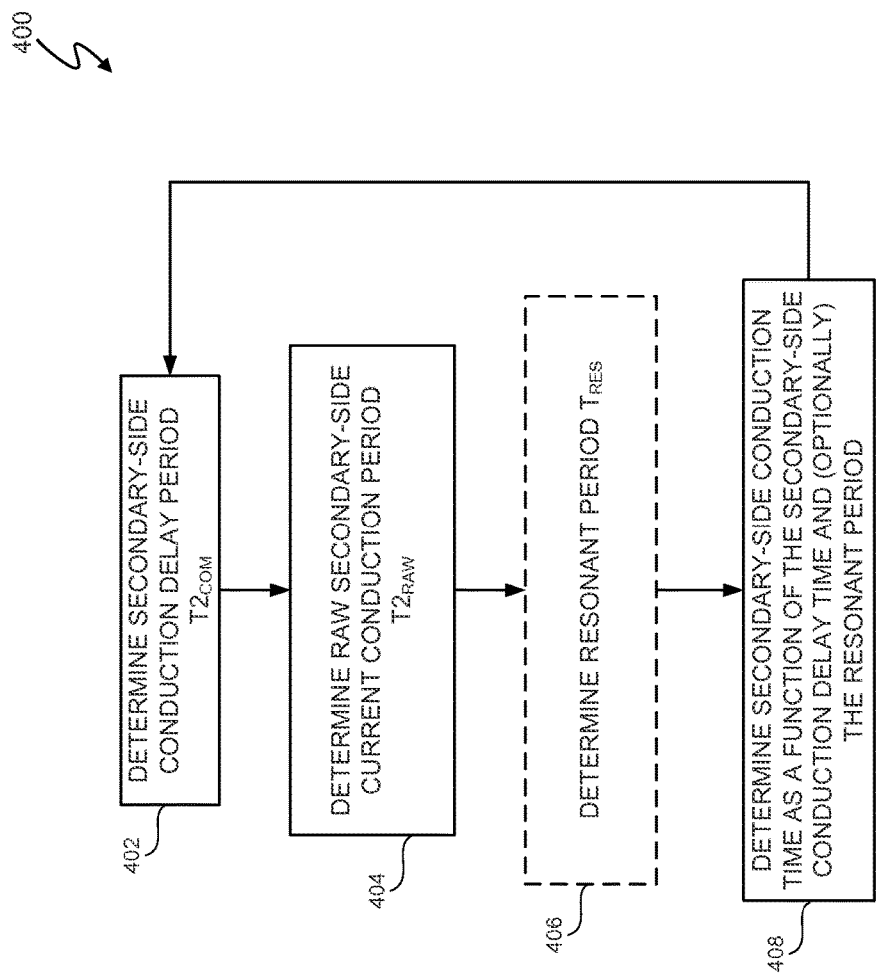
FIG. 4 depicts an exemplary switching power converter control parameter determination process.
Figure 5:
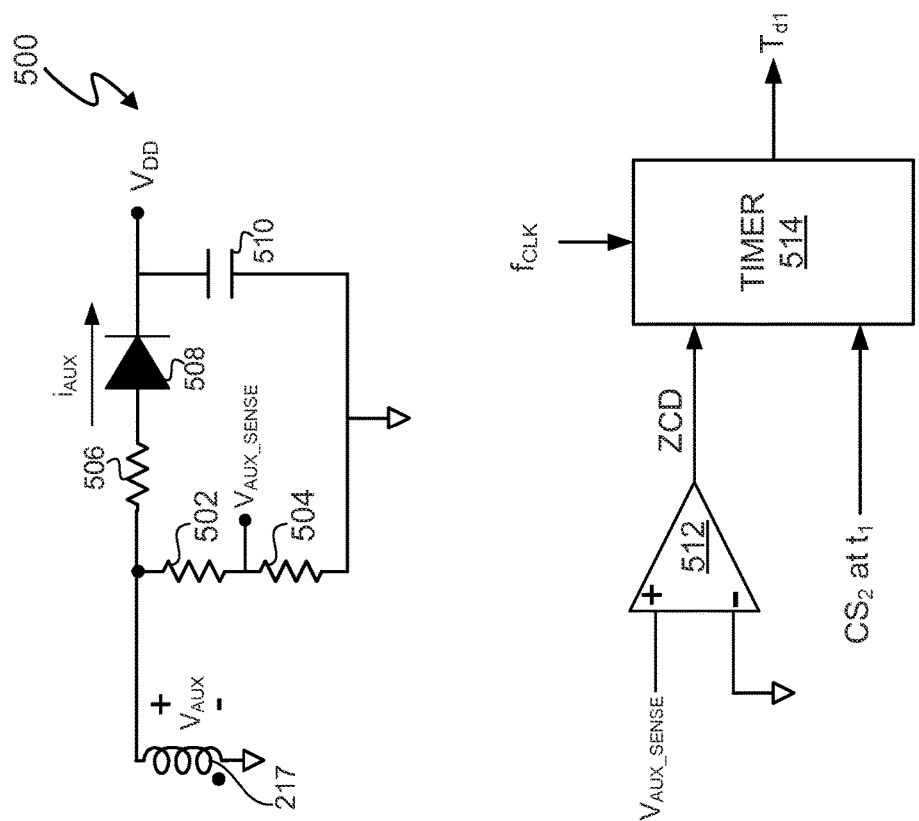
FIG. 5 depicts an exemplary zero crossing detector and time delay component generator.

FIG. 4 depicts an exemplary secondary-side current conduction period $T2_{ACTUAL}$ determination process 400 performed by controller 202. Referring to FIGS. 2, 3, and 4, in operation 402, controller 202 determines the secondary-side conduction delay period $T2_{COM}$. The period $T2_{COM}$ can be broken down into two periods of time referred to as $T_{d1}$ and $T_{d2}$ such that $T2_{COM} = T_{d1} + T_{d2}$. The process of determining the time periods $T_{d1}$ and $T_{d2}$ is a matter of design choice. The period $T_{d1}$ represents the elapsed time between an end of the control signal $CS_2$ pulse at time $t_1$, until the next indication at time t2 by the zero crossing detection signal ZCD of a 0V crossing of the auxiliary voltage $V_{AUX}$ across the auxiliary-winding 217. As subsequently described, FIG. 5 depicts an exemplary period $T_{d1}$ generator. The power distribution system 200 includes a zero crossing detector 218 that detects a zero crossing of the auxiliary voltage $V_{AUX}$ across the auxiliary-winding 217 and generates the zero crossing signal ZCD. In at least one embodiment, the signal ZCD indicates that the auxiliary voltage $V_{AUX}$ crosses 0V from negative to positive by changing state from a logical 0 to a logical 1 (for example, at times $t_2$ and $t_6$), and indicates a zero crossing from positive to negative by changing state from a logical 1 to a logical 0 (for example, at times $t_5$ and $t_7$).

The controller 202 can also determine the second component $T_{d2}$ in any manner of ways. In one embodiment, the controller 202 multiplies the time delay $T_{d1}$ by a scale factor k that represents the relative proportion of $T_{d2}/T_{d1}$ and adds the time delay $T_{d1}$ to generate the secondary-side conduction delay period $T2_{COM}$, i.e. $T2_{COM} = T_{d1} + (T_{d1} \cdot k)$. In at least one embodiment, k equals $N \cdot V_S/V_P$, wherein N is the ratio of winding turns in the primary-side winding 210 to the secondary-side winding 204, $V_S$ is the secondary-side voltage, and $V_P$ is the primary-side voltage. Since $V_S = (V_P/N)$, k equals 1. In at least one embodiment, controller 202 computes time period $T_{d2}$ as equal to the elapsed time between when the signal ZCD transitions to a logical 1 at time $t_2$ until the first mathematical derivative of the auxiliary voltage $V_{AUX}$ equals 0. The controller 202 then adds $T_{d1}$ and $T_{d2}$ to determine the secondary-side conduction delay time $T2_{COM}$. In at least one embodiment, the controller 202 senses a signal $V_{DRAIN}$ representing a drain voltage $V_{C-LUMP}$ of switch 212 when the switch 212 is a FET, processes the sensed signal $V_{DRAIN}$ representing the drain voltage to determine the elapsed time $T_{d2}$ between cessation of the primary-side current conduction at time t1 and when a first mathematical derivative of the sensed signal representing the drain voltage equals zero at time $t_3$. The controller 202 then adds $T_{d1}$ and $T_{d2}$ to determine the secondary-side conduction delay time $T2_{COM}$. In at least one embodiment, the controller 202 senses a signal representing a gate voltage $V_{GATE}$ of switch 212 to determine the secondary-side conduction delay time $T2_{COM}$. When the switch 212 is a FET, to turn the switch 212 "OFF", the control signal $CS_2$ asserts a logical zero, e.g. 0V, pulse on the gate of the switch 212, which is the terminal of the FET-based switch 212 that receives the control signal $CS_2$. Due to the inherent Miller capacitance of the FET-based switch 212, the gate voltage $V_{GATE}$ will virtually simultaneously decrease with the logical zero pulse of the control signal $CS_2$ to a threshold voltage of the FET switch 212. When the drain voltage $V_{DRAIN}$ rises to the input voltage $V_{IN}$, the gate voltage $V_{GATE}$ will decrease to 0V, which signifies the end of the secondary-side conduction delay time $T2_{COM}$. Thus, in at least one embodiment, by sensing the gate voltage $V_{GATE}$, the controller 202 can determine the secondary delay time $T2_{COM}$.

In operation 404, controller 202 determines the raw secondary-side conduction period $T2_{RAW}$. The controller 202 determines the period $T2_{RAW}$ by determining an elapsed time from when the controller 202 ends the pulse of the control signal $CS_2$ at time $t_1$ until the controller 202 detects the next occurrence of the zero crossing detection signal ZCD transitioning from a logical 1 to a logical 0 at time $t_5$. However, the time $T2_{RAW}$ does not take into account the secondary-side conduction time delay between times $t_1$ and $t_3$ or the resonance delay $T_{RES}/4$ between times $t_4$ and $t_5$. The resonant delay $T_{RES}/4$ is subsequently described in more detail.

In operation 406, the control parameter generator 204 optionally determines the resonant period $T_{RES}$ as, for example, described in *Grisamore/He*.

In operation 408, in at least one embodiment, the secondary-side conduction time delay module 205 determines the actual secondary-side conduction time $T2_{ACTUAL}$ in accordance with:

$$T2_{ACTUAL} = T2_{RAW} - T2_{COM} - T_{RES}/4 \qquad \text{Equation 3}$$

$T2_{RAW}$ represents the ideal, unadjusted secondary-side conduction time, $T2_{COM}$ represents the secondary-side conduction delay period ($T2_{COM} = T_{d1} + T_{d2}$), and $T_{RES}/4$ represents a resonant period factor of $T_{RES}/4$.

Based on the value of $T2_{ACTUAL}$, the control signal generator 211 generates the control signal $CS_2$ as previously described.

FIG. 5 depicts an exemplary zero crossing detector and time delay component $T_{d1}$ generator 500. A voltage divider of resistors 502 and 504 generates a scaled sample of the auxiliary voltage $V_{AUX\_SENSE}$. Current from the auxiliary-winding 217 also flows through resistor 506 and 508 to charge capacitor 510 and, thereby, provide an auxiliary voltage $V_{DD}$ to the controller 202. Comparator 512 compares the sensed auxiliary voltage signal $V_{AUX\_SENSE}$ with a reference voltage to generate the zero cross detection signal ZCD with the logical states as previously described. At the occurrence of the end of the pulse of control signal $CS_2$ at t1, the timer 514 begins counting at a frequency of $f_{CLK}$ until the zero crossing detection signal ZCD transitions from logical 0 to logical 1. The elapsed time equals the secondary conduction delay time component $T_{d1}$.

The particular implementation of the controller 202 is a matter of design choice. In at least one embodiment, the controller 202 is implemented as an integrated circuit that includes hardware components that are configured to implement the functionality of the controller 202 including the control signal generator 211 and the control parameter generator 204 with the secondary-side conduction time delay module 205. In at least one embodiment, the controller 202 includes a memory (not shown) that includes code that is executable by and, thus, programs a processor (not shown) of the controller 202 to implement the secondary-side current conduction period $T2_{ACTUAL}$ determination process 400. In at least one embodiment, the controller 202 includes logic gates configured and/or the processor, memory, and code that are configured to implement the secondary-side current conduction period $T2_{ACTUAL}$ determination process 400. The particular implementation of the switching power converter 217 is also a design choice. FIG. 2 depicts one embodiment, but other components can be added to the switching power converter 217 in any well-known manner. Additionally, although the switching power converter in the power distribution system 202 is a flyback-type switching power converter. The switching power converter in power distribution system 202 can be any type of switching power converter where there is a secondary-side transformer conduction time delay. Other such types of switching power converter include boost and boost-buck switching power converters.

Thus, a power distribution system includes controller of a switching power converter that controls the delivery of energy to a load using a secondary-side conduction time of a secondary-side transformer winding of the switching power converter that accounts for a secondary-side conduction time delay and, in at least one embodiment, a resonant period factor of an auxiliary-winding voltage.

Although embodiments have been described in detail, it should be understood that various changes, substitutions, and alterations can be made hereto without departing from the spirit and scope of the invention as defined by the appended claims.

What is claimed is:

1. A method comprising:
   receiving one or more signals from a switching power converter;
   processing the one or more signals to determine an approximate secondary-side conduction time delay that begins when at least one of the signals indicates cessation of primary-side current conduction in a transformer of the switching power converter and ends when conduction begins in a secondary-side current in the transformer;
   determining the secondary-side current conduction time utilizing the secondary-side conduction time delay;
   determining an approximate amount of charge transferred to the secondary-side of the transformer using the determined secondary-side current conduction time; and
   generating a current control signal to control power delivered to a load coupled to the switching power converter based on the determined approximate amount of charge transferred to the secondary-side of the transformer.

* * * * *